(12) United States Patent
Yannam et al.

(10) Patent No.: US 11,595,527 B2
(45) Date of Patent: Feb. 28, 2023

(54) DYNAMIC ROUTING FOR COMMUNICATION SYSTEMS

(71) Applicant: Bank of America Corporation, Charlotte, NC (US)

(72) Inventors: Ramakrishna R. Yannam, The Colony, TX (US); Donatus Asumu, Mckinney, TX (US); Ion Gerald McCusker, Allen, TX (US); Saahithi Chillara, Allen, TX (US); Ashwini Patil, Richardson, TX (US); Ravisha Andar, Plano, TX (US); Emad Noorizadeh, Plano, TX (US); Priyank R. Shah, Plano, TX (US); Devanshu Mukherjee, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 77 days.

(21) Appl. No.: 17/203,059

(22) Filed: Mar. 16, 2021

(65) Prior Publication Data
US 2022/0303390 A1    Sep. 22, 2022

(51) Int. Cl.
*H04M 3/523* (2006.01)
*H04L 51/02* (2022.01)
*H04M 3/51* (2006.01)

(52) U.S. Cl.
CPC .......... *H04M 3/5235* (2013.01); *H04L 51/02* (2013.01); *H04M 3/5166* (2013.01); *H04M 3/5233* (2013.01); *H04M 2201/40* (2013.01)

(58) Field of Classification Search
CPC ............ H04M 3/5235; H04M 3/5166; H04M 3/5233; H04M 2201/40; H04L 51/02
See application file for complete search history.

(56) References Cited

U.S. PATENT DOCUMENTS

| | | |
|---|---|---|
| 4,191,860 A | 3/1980 | Weber |
| 4,601,064 A | 7/1986 | Shipley |
| 4,611,094 A | 9/1986 | Asmuth et al. |
| 4,649,385 A | 3/1987 | Aires et al. |
| 4,658,416 A | 4/1987 | Tanaka |
| 4,757,267 A | 7/1988 | Riskin |
| 4,924,510 A | 5/1990 | Le |
| 4,990,892 A | 2/1991 | Guest et al. |

(Continued)

OTHER PUBLICATIONS

Yannam, R. R. et al., "Performance Monitoring for Communication Systems," U.S. Appl. No. 17/202,979, filed Mar. 16, 2021, 39 pages.

*Primary Examiner* — Lisa Hashem (57) ABSTRACT

A device that is configured to assign users to an issue cluster based on issue types for the users. The device is further configured to identify available agents and to assign each available agent to one or more knowledge area clusters based on knowledge scores. A knowledge score indicates an expertise level for an agent in a knowledge area. The device is further configured to identify an issue cluster that is associated with an issue type and to identify a user from the issue cluster. The device is further configured to identify a knowledge area cluster that is associated with the issue type and to identify an agent from the knowledge area cluster. The device is further configured to establish a network connection between a user device associated with the user and a user device associated with the agent.

17 Claims, 6 Drawing Sheets

(56) References Cited

U.S. PATENT DOCUMENTS

| | | | |
|---|---|---|---|
| 5,001,710 A | 3/1991 | Gawrys et al. | |
| 5,018,191 A | 5/1991 | Catron et al. | |
| 5,023,904 A | 6/1991 | Kaplan et al. | |
| 5,062,151 A | 10/1991 | Shipley | |
| 5,095,505 A | 3/1992 | Finucane et al. | |
| 5,136,636 A | 8/1992 | Wegrzynowicz | |
| 5,163,087 A | 11/1992 | Kaplan | |
| 5,390,232 A | 2/1995 | Freeman et al. | |
| 5,465,286 A | 11/1995 | Clare et al. | |
| 5,533,107 A | 7/1996 | Irwin et al. | |
| 5,548,637 A | 8/1996 | Heller et al. | |
| 5,588,048 A | 12/1996 | Neville | |
| 5,704,017 A * | 12/1997 | Heckerman | G06Q 30/02 706/45 |
| 5,822,418 A | 10/1998 | Yacenda et al. | |
| 5,825,864 A | 10/1998 | McGraw et al. | |
| 5,825,869 A * | 10/1998 | Brooks | H04M 3/5233 379/265.12 |
| 5,838,223 A | 11/1998 | Gallant et al. | |
| 5,848,131 A | 12/1998 | Shaffer et al. | |
| 5,862,209 A | 1/1999 | Kapsales | |
| 5,867,562 A | 2/1999 | Scherer | |
| 5,907,608 A | 5/1999 | Shaffer et al. | |
| 6,125,176 A | 9/2000 | Foladare et al. | |
| 6,154,139 A | 11/2000 | Heller | |
| 6,314,296 B1 | 11/2001 | Hamada et al. | |
| 6,320,534 B1 | 11/2001 | Goss | |
| 6,359,711 B1 | 3/2002 | Cole et al. | |
| 6,385,312 B1 | 5/2002 | Shaffer et al. | |
| 6,654,451 B1 | 11/2003 | Ward | |
| 6,816,733 B1 | 11/2004 | Dezonno et al. | |
| 6,823,054 B1 * | 11/2004 | Suhm | H04M 3/36 379/112.01 |
| 7,020,138 B2 | 3/2006 | Huang | |
| 7,042,337 B2 | 5/2006 | Borders et al. | |
| 7,505,575 B2 | 3/2009 | Fleischer, III et al. | |
| 8,384,753 B1 | 2/2013 | Bedingfield, Sr. | |
| 8,477,691 B2 | 7/2013 | Bohacek et al. | |
| 9,178,999 B1 * | 11/2015 | Hegde | H04M 3/5175 |
| 9,338,079 B2 | 5/2016 | Cai et al. | |
| 9,571,646 B2 * | 2/2017 | Kumar | H04M 3/5183 |
| 9,848,085 B2 * | 12/2017 | Conway | H04M 3/5233 |
| 10,116,556 B2 | 10/2018 | Shen | |
| 2001/0028711 A1 | 10/2001 | Antonucci et al. | |
| 2002/0046030 A1 * | 4/2002 | Haritsa | G10L 17/26 704/255 |
| 2003/0227922 A1 | 12/2003 | Horvath et al. | |
| 2004/0228466 A1 | 11/2004 | Bedingfield, Sr. et al. | |
| 2005/0221713 A1 | 1/2005 | Dugan et al. | |
| 2005/0213723 A1 | 9/2005 | Chung | |
| 2007/0297595 A1 | 12/2007 | Bedingfield, Sr. et al. | |
| 2014/0207532 A1 * | 7/2014 | Thapliyal | G06Q 10/06398 705/7.42 |
| 2014/0219438 A1 * | 8/2014 | Brown | H04M 3/5191 379/265.09 |
| 2020/0342462 A1 * | 10/2020 | Todd | G06Q 10/105 |

\* cited by examiner

| | Resolution Type 1 | Resolution Type 2 | Resolution Type 3 | Resolution Type 4 |
|---|---|---|---|---|
| Issue Type 1 | 5 | 4 | 3 | 2 |
| Issue Type 2 | 3 | 2 | 5 | 4 |
| Issue Type 3 | 4 | 5 | 3 | 2 |
| Issue Type 4 | 4 | 3 | 2 | 5 |

FIG. 3A

| | Knowledge Area 1 | Knowledge Area 2 | Knowledge Area 3 | Knowledge Area 4 |
|---|---|---|---|---|
| Agent 1 | 5 | 4 | 5 | 4 |
| Agent 2 | 5 | 5 | 3 | 5 |
| Agent 3 | 3 | 3 | 4 | 5 |
| Agent 4 | 4 | 4 | 3 | 5 |

FIG. 3B

| | Issue Type 1 | Issue Type 2 | Issue Type 3 | Issue Type 4 |
|---|---|---|---|---|
| User 1 | X | | | |
| User 2 | X | | | |
| User 3 | | X | X | |
| User 4 | | | X | X |

DYNAMIC ROUTING FOR COMMUNICATION SYSTEMS

TECHNICAL FIELD

The present disclosure relates generally to communication systems, and more specifically to dynamic routing for communication systems.

BACKGROUND

Existing communication systems typically connect users with the first available agent without identifying any issues that the user is experiencing and/or without determining whether the available agent has the knowledge or expertise to assist the user. When a user is connected to an agent that does not have the knowledge or expertise to assist the customer, the amount of time it takes to resolve the user's issues increases. While the agent is assisting the user, the network resources of the communication system are occupied. This means that the network resources are also occupied for a longer amount of time when a user is connected to an agent that does not have the knowledge or expertise to assist the customer. In some instances, the amount of time that network resources are occupied may further increase because the agent may need to transfer the user to another agent that is better suited to assist the customer. In addition to the network resources being occupied, the communication system's bandwidth and throughput also decrease. This limits the communication system's ability to assist other users.

SUMMARY

The system disclosed in the present application provides a technical solution to the technical problems discussed above by providing a communication system that is configured to identify any issues that the user is experiencing and to connect the user with an agent that can best help resolve the user's issues. This process allows the communication system to improve resource utilization by avoiding situations where an agent does not have the knowledge level to resolve a user's issues and/or situations where a user may need to be rerouted to other agents to resolve their issues. By improving resource utilization, the communication system is able to reduce the amount of time that the resources of the communication system are used while assisting users. By reducing the amount of time that the communication system's resources are used, the communication system is able to increase the bandwidth and throughput of the communication system. This means that the communication system is able to handle a larger volume of user interactions without requiring additional resources.

The communication system is further configured to track the performance of the agents based on their abilities to assist users. This process allows the communication system to learn about the knowledge level of an agent based on the responses that they provide to a user. By learning and tracking the knowledge level of the agent, the communication system is able to use this information later when establishing connections between a user and an agent. As discussed above, existing communication systems typically connect a user with the first available agent. This approach can lead to the communication system's resources being occupied for extended amounts of time which reduce the throughput of the communication system. In contrast, the disclosed communication system periodically updates its information about its agents based on their real-time interactions with users. This process allows the communication system to use the most recent information about its agents when identifying an agent to connect with a user. As previously discussed, this process allows the communication system to handle a larger volume of user interactions without requiring additional resources.

In one embodiment, the communication system comprises a device that is configured to establish a network connection between a user and an agent. The connection may be a voice call, a video call, a text-based chat session, or any other suitable type of communication channel between the user's user device and the agent's user device. The device is further configured to identify an issue for the user and to identify a resolution that is provided by the agent based on a conversation between the user and the agent. The device is further configured to identify a performance score from a resolution mapping based on a combination of the issue and the resolution. The performance score is a numerical value that indicates how well a resolution resolves the issue. The device is further configured to identify a knowledge area that is associated with the issue and to update a knowledge score that is associated with the knowledge area in a performance record for the agent based on the performance score. The knowledge score is a numerical value that indicates an expertise level for the agent in a knowledge area. This process allows the communication system to learn and track the knowledge level of the agent. The device is further configured to send feedback to the agent based at least in part on the performance score.

In another embodiment, the communication system comprises a device that is configured to assign users to an issue cluster based on an issue the users are experiencing. Each issue cluster is associated with one or more types of issues. The device is further configured to identify available agents and to assign each available agent to one or more knowledge area clusters based on their knowledge scores. The knowledge score is a numerical value that indicates an expertise level for an agent in a knowledge area. The device is further configured to identify a user from an issue cluster and to identify a knowledge area cluster that is associated with the issue that the user is experiencing. The device is further configured to identify an agent from the knowledge area cluster and to establish a connection between a user device associated with the user and a user device associated with the agent.

Accordingly, the present disclosure improves underlying networking and computing technologies to achieve at least the following practical applications: (1) enables a communication system to handle a larger volume of user interactions without requiring additional resources; (2) enables a communication system to periodically update its routing information based on its agents' real-time interactions with users; and (3) enables a communication system to improve resource utilization by dynamically connecting users to agents based on learned information about its agents' knowledge level.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

System Overview

Figure 1:
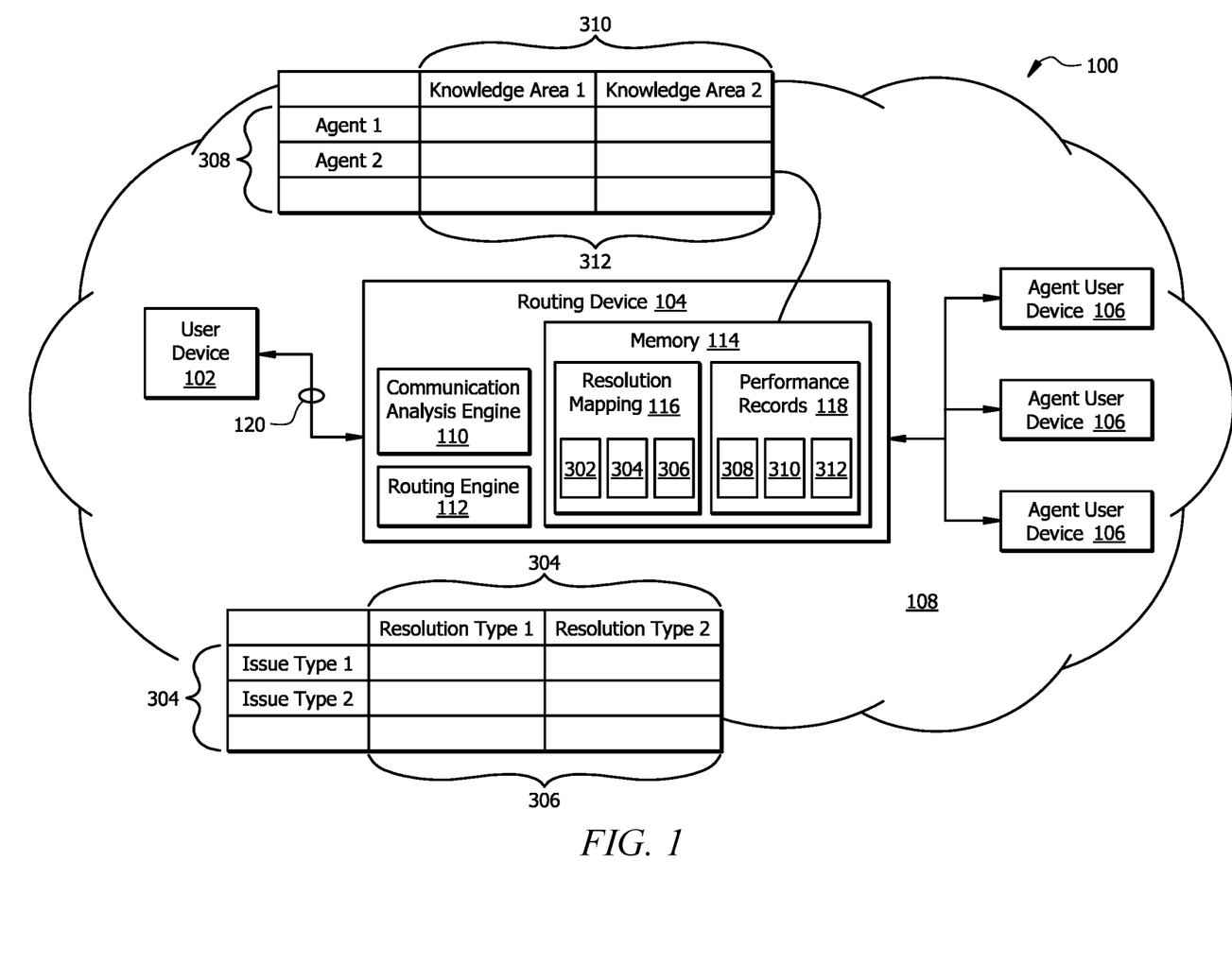
FIG. 1 is a schematic diagram of an embodiment of a communication system that is configured to use dynamic routing.

FIG. 1 is a schematic diagram of an embodiment of a communication system 100. The communication system 100 is generally configured to dynamically establish connections between users and agents based on knowledge about issues that the users are experiencing and the knowledge level of the agents. A user may be anyone with a question or technical issue that needs help. An agent may be anyone who has knowledge or information that can assist a user. For example, a user may be a customer that needs help with an electronic device or an online account. In this example, the agent may be a member of customer support or technical support.

In contrast to existing communication systems, the communication system 100 is configured to identify any issues that the user is experiencing and to connect the user with an agent that can best help resolve the user's issues. This process helps avoid situations where a user is connected to an agent that does not have the knowledge or expertise to assist the user which negatively impacts the communication system's resource utilization, bandwidth, and throughput. Thus, this process allows the communication system 100 to improve resource utilization and increase the bandwidth and throughput of the communication system 100. By improving resource utilization, the communication system 100 is able to reduce the amount of time that the resources of the communication system 100 are used while assisting users. By reducing the amount of time that the communication system's resources are used, the communication system 100 is able to increase the bandwidth and throughput of the communication system 100. This means that the communication system 100 is able to handle a larger volume of user interactions without requiring additional resources.

The communication system 100 is further configured to track the performance of the agents based on their abilities to assist users. This process allows the communication system 100 learn about the knowledge level of the agents. By learning and tracking the knowledge level of the agents the communication system 100 is able to use this information later when establishing connections between a user and an agent. As previously discussed above, existing communication systems typically connect a user with the first available agent. This approach can lead to the communication system's resources being occupied for extended amounts of time which reduce the throughput of the communication system. In contrast, the communication system 100 periodically updates its information about its agents based on their real-time interactions with users. This process allows the communication system 100 to use the most recent information about its agents when identifying an agent to connect with a user. As previously discussed, this process allows the communication system 100 to handle a larger volume of user interactions without requiring additional resources.

Network

The communication system 100 comprises one or more user devices 102, a routing device 104, and one or more agent user devices 106 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

User Devices

Examples of the user device 102 include, but are not limited to, a telephone, a smartphone, a tablet, a smartwatch, a laptop, a computer, or any other suitable type of user device. The user device 102 is generally configured to allow a user to send a communication request 120 to a routing device 104 and to allow the user to communicate with an agent. As an example, a user may use the user device 102 to send a communication request 120 to the routing device 104 by placing a call to the routing device 104. As another example, the user may use the user device 102 to send a communication request 120 to the routing device 104 by interacting with an application on a smartphone or a computer. As another example, the user may use the user device 102 to send a communication request 120 to the routing device 104 by interacting with a chat window on a webpage that is associated with the routing device 104. In other examples, the user may use the user device 102 to send a communication request 120 to the routing device 104 using any other suitable technique.

Agent User Devices

Examples of the agent user devices 106 include, but are not limited to, a telephone, a smartphone, a tablet, a laptop, a computer, or any other suitable type of user device. The agent user device 106 is generally configured to allow an agent to communicate with a user. As an example, an agent user device 106 may be a telephone, a voice-over-IP telephone, or a smartphone that allows an agent to have a voice call with a user. As another example, an agent user device 106 may be a tablet or computer that allows an agent to have a text-based chat session with a user.

Routing Device

Examples of the routing device 104 include, but are not limited to, a server, a computer, or any other suitable type of network device. The routing device 104 is generally configured to identify any issues that the user is experiencing and to connect the user with an agent that can best help resolve the user's issues. An example of the routing device 104 performing this operation is described below in FIG. 4. The routing device 104 is further configured to track the performance of the agents based on their ability to assist users. An example of the routing device 104 performing this operation is described below in FIG. 2.

In one embodiment, the routing device 104 comprises a communication analysis engine 110, a routing engine 112, and a memory 114. Additional details about the hardware configuration of the routing device 104 are described in FIG.

5. The memory 114 is configured to store a resolution mapping 116, performance records 118, and/or any other suitable type of data. The communication analysis engine 110 is generally configured to track the performance of the agents based on their ability to assist users. An example of the communication analysis engine 110 in operation is described below in FIG. 2. The routing engine 112 is generally configured to identify any issues that the user is experiencing and to connect the user with an agent that can best help resolve the user's issues. An example of the routing engine 112 in operation is described below in FIG. 4.

The routing device 104 is configured to use the resolution mapping 116 to determine how well an agent is performing during a conversation with a user about the user's issues. The resolution mapping 116 is generally configured to associate different issues that a user may be experiencing with different types of resolutions for solving the issues. An example of a resolution mapping 116 is shown in FIG. 3A. For a given issue type 304, each resolution type 302 is given a performance score 306. The performance score 306 is a numerical value that indicates how well a resolution type 302 resolves the issue type 304. For example, when a resolution type 302 significantly resolves the issue type 304, the combination of the resolution type 302 and the issue type 304 may be associated with a relatively high performance score 306. Alternatively, when a resolution type 302 poorly resolves the issue type 304, the combination of the resolution type 302 and the issue type 304 may be associated with a relatively low performance score 306. An example of using the resolution mapping 116 is described in FIG. 2.

The routing device 104 is configured to use the performance records 118 to track the overall performance of agents. The routing device 104 also uses the information from the performance records 118 to determine the best available agent to address a user's issue when establishing connections between users and agents. An example of a performance record 118 is shown in FIG. 3B. The performance record 118 is generally configured to indicate an expertise level for an agent in a knowledge area 310. A knowledge area 310 may be associated with products, services, technical information, account information, financial information, or any other suitable type of information that can be used to assist a user. Each knowledge area 310 is associated with one or more issue types 304 that a user may be experiencing. For example, a knowledge area 310 may be associated with technical information for resolving networking issues or device issues. An example of using the performance record 118 is described in FIGS. 2 and 4.

Communication Monitoring

Figure 2:
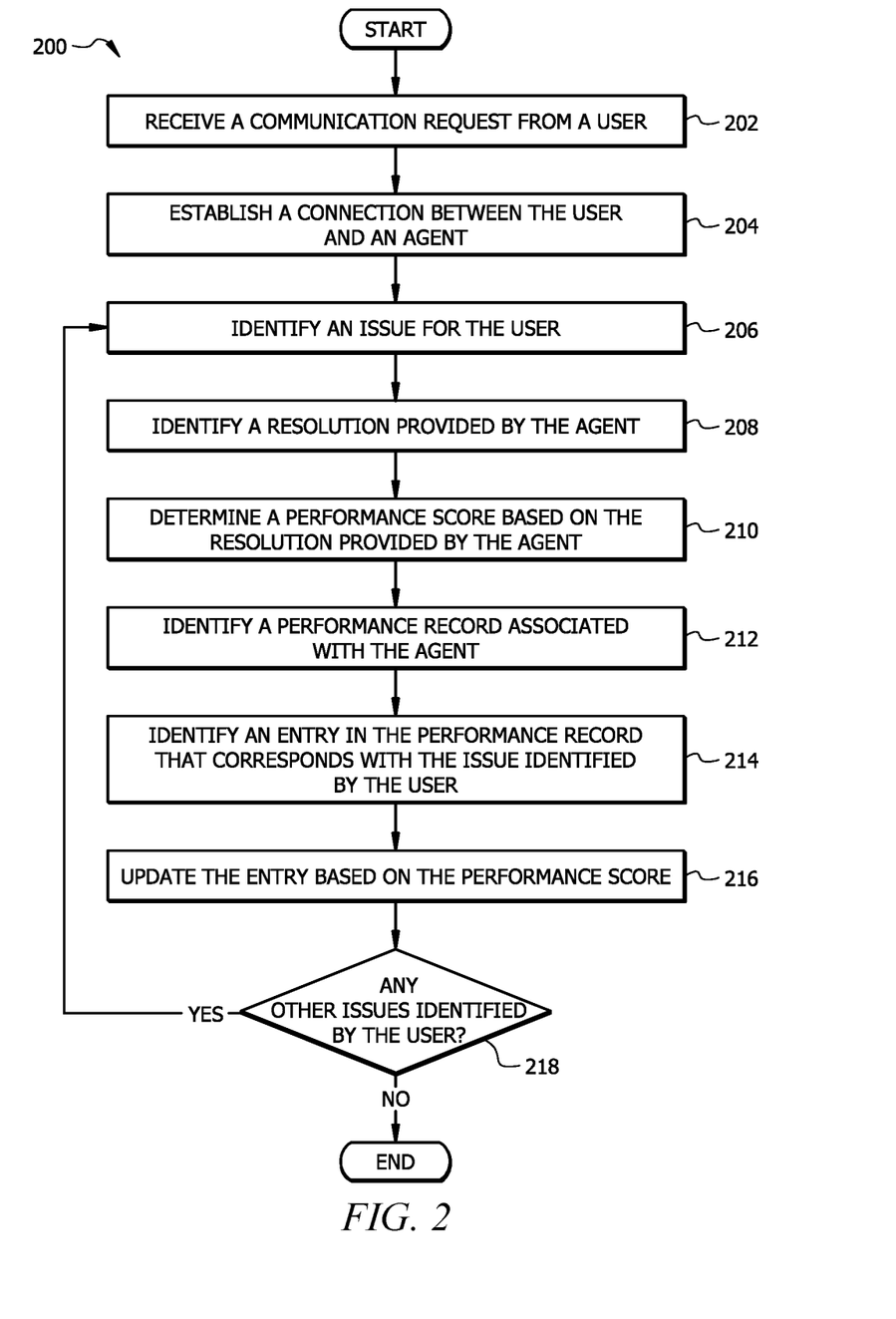
FIG. 2 is a flowchart of an embodiment of a communication monitoring process for the communication system.
Figure 3A:
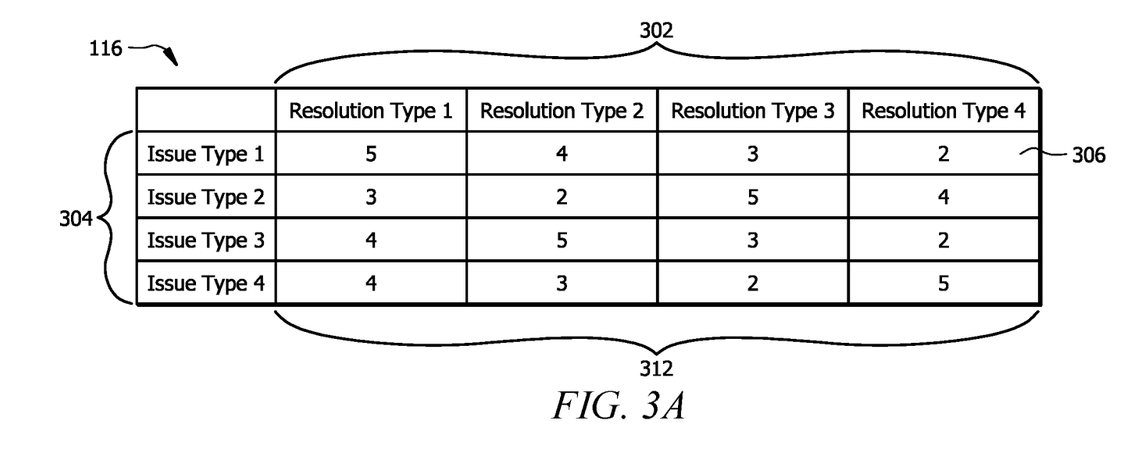
FIG. 3A is an example of a resolution mapping.
Figure 3B:
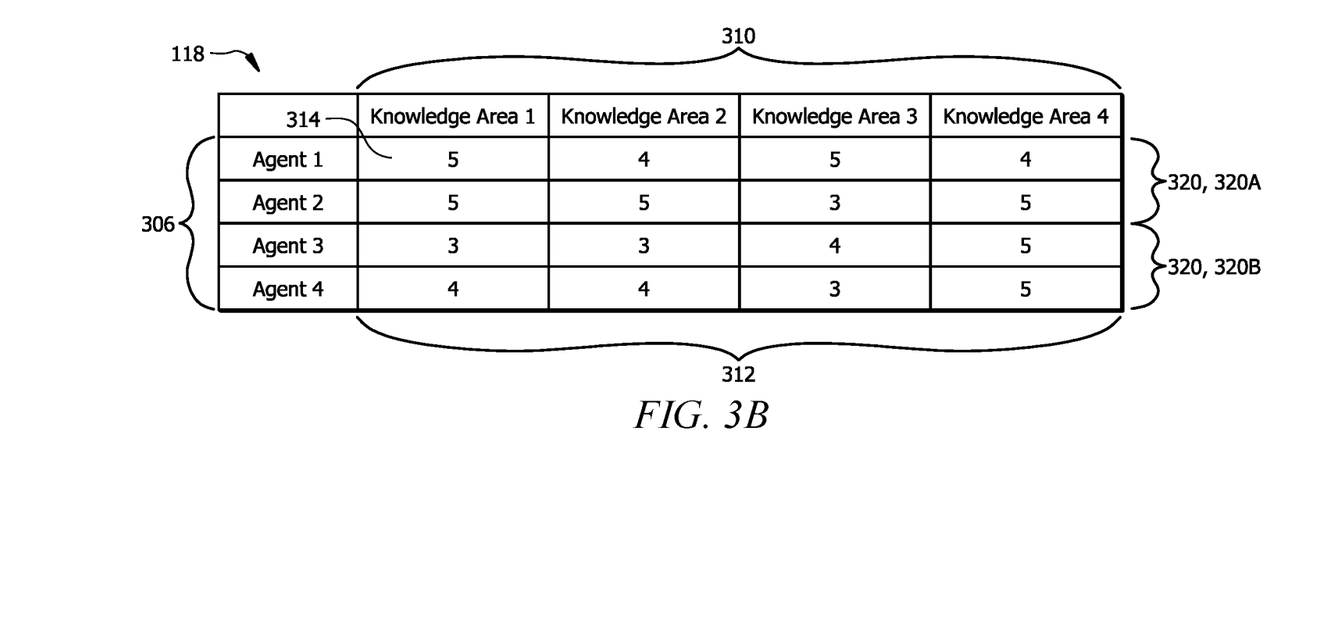
FIG. 3B is an example of a performance record.

FIG. 2 is a flowchart of an embodiment of a communication monitoring process 200 for the communication system 100. The communication system 100 may employ process 200 to track the performance of an agent based on their ability to assist a user. Process 200 allows the routing device 104 to learn about the knowledge level of an agent based on the responses and the resolutions that they provide to a user. By learning and tracking the knowledge level of the agent, the routing device 104 is able to use this information later when identifying the best available agent for assisting the user.

At step 202, the routing device 104 receives a communication request 120 from a user on a user device 102. The communication request 120 may be a request made using a voice call, a video call, a text-based chat session, or any other suitable type of communication channel with an agent. As an example, the user may use a mobile application or web browser on the user device 102 to request to speak or chat with an agent.

At step 204, the routing device 104 establishes a connection between the user's user device 104 and an agent on an agent user device 106. As an example, the routing device 104 may identify an agent that is currently available and the agent user device 106 that is associated with the agent. As another example, the routing device 104 may use a process similar to process 400 to identify an agent and an agent user device 106. After identifying an available agent and their agent user device 106, the routing device 104 may establish a voice call, a video call, a text-based chat session, or any other suitable type of communication channel between the user's user device 102 and the identified agent user device 106. The communication channel may be established using any suitable technique or protocol.

At step 206, the routing device 104 identifies an issue for the user. In one embodiment, the routing device 104 may provide a survey that comprises one or more questions for the user about the reason for their communication request 120. As an example, the routing device 104 may use an automated assistant to send questions to the user's user device 102 about any issues they are experiencing or questions that they may have. In some instances, the routing device 104 may provide the survey before establishing the connections between the user and the agent.

In response to sending questions to the user device 102, the routing device 104 receives a survey response from the user. The routing device 104 may use speech processing and/or natural language processing to interpret the survey response and to identify any issues that the user is having. For example, the user device 102 may send a voice sample that includes the user's responses to the provided questions. In this example, the routing device 104 may use speech recognition to identify keywords spoken by the user that corresponds with any issues that the user is experiencing. As another example, the user device 102 may send a text that includes the user's responses to the provided questions. In this example, the routing device 104 may use text recognition and natural language processing to identify keywords that correspond with any issues that the user is experiencing.

In another embodiment, the routing device 104 may use speech and/or natural language processing on a conversation between the user and the agent to identify any issues that the user is experiencing or questions that the user has. As an example, the routing device 104 may use speech recognition to identify keywords within the conversation that correspond with any issues that the user is experiencing. As another example, the routing device 104 may use text recognition and natural language processing on a text-based conversation between the user and the agent to identify keywords that correspond with any issues that the user is experiencing. In other examples, the routing device 104 may use any other suitable technique to process information from the user and to identify issues.

After identifying an issue, the routing device 104 determines an issue type 304 classification for the issue. Examples of issue types include, but are not limited to, technical issues, account issues, product issues, software issues, hardware issues, website issues, or any other suitable type of issue. In one embodiment, the routing device 104 may use a mapping between keywords and issue types to identify an issue type that corresponds with an issue the user is experiencing. For example, the routing device 104 may identify the keywords "log-in," "password," and "error." In this example, the routing device 104 may identify an issue type of "account issue" that corresponds with the identified keywords. In other embodiments, the routing device 104 may use machine learning or any other suitable technique to identify an issue type that corresponds with an issue the user is experiencing.

At step 208, the routing device 104 identifies a resolution provided by the agent. In one embodiment, the routing device 104 may use speech processing and/or natural language process on the conversation between the user and the agent to identify any resolutions that the agent provides. As an example, the routing device 104 may use speech recognition to identify keywords spoken by the agent during the conversation that correspond with resolutions that the agent provides. As another example, the routing device 104 may use text recognition and natural language processing on a text-based conversation between the user and the agent to identify keywords that correspond with any resolutions that the agent provides. In other examples, the routing device 104 may use machine learning or any other suitable technique to process information from the agent to identify any resolutions that the agent provides.

At step 210, the routing device 104 determines a performance score 306 based on the resolution that is provided by the agent. In one embodiment, the routing device 104 uses the resolution mapping 116 to determine a performance score 306. Referring to the example in FIG. 3A, the resolution mapping 116 is configured to map different resolution types 302 to different issue types 304. Each combination of a resolution type 302 and an issue type 304 has a corresponding performance score 306. The performance score 306 is a numerical value that indicates how well a resolution type 302 resolves an issue type 304. For example, when a resolution type 302 significantly resolves an issue type 304, the combination of the resolution type 302 and the issue type 304 may be associated with a relatively high performance score 306. Alternatively, when a resolution type 302 poorly resolves an issue type 304, the combination of the resolution type 302 and the issue type 304 may be associated with a relatively low performance score 306. In this example, the routing device 104 uses the previously identified resolution type 302 and issue type 304 to look up a corresponding performance score 306 in the resolution mapping 116. In FIG. 3A, the resolution mapping 116 is shown as a table. In other examples, the resolution mapping 116 may be implemented using any other suitable type of data structure and/or using a machine learning model.

At step 212, the routing device 104 identifies a performance record 118 associated with the agent. Referring to FIG. 3B as an example, the performance record 118 may be associated with an agent identifier 308 for a plurality of agents. Each agent identifier 308 is mapped to a plurality of knowledge areas 310. A knowledge area 310 may be associated with products, services, technical information, account information, financial information, or any other suitable type of information that can be used to assist a user. Each knowledge area 310 is associated with one or more issue types 304. For example, a knowledge area 310 may be associated with technical information for resolving networking issues or device issues. Each agent identifier 308 is also associated with a knowledge score 312. A knowledge score 312 is a numeric value that indicates an expertise level for an agent in a knowledge area 310.

Returning to FIG. 2 at step 214, the routing device 104 identifies an entry in the performance record 118 that corresponds with the issue identified by the user. Referring again to FIG. 3B, the user may be connected with "Agent 1" and have an issue type that corresponds with "Knowledge Area 1." In this example, the routing device 104 identifies an entry 314 in the performance record 118 that corresponds with "Agent 1" and "Knowledge Area 1."

At step 216, the routing device 104 updates the knowledge area entry 314 based on the performance score 306. As an example, the routing device 104 may average the current knowledge score 312 with the performance score 306. As another example, the routing device 104 may replace the current knowledge score 312 with the performance score 306. In other examples, the routing device 104 may use any other suitable technique to update the current knowledge score 312 based on performance score 306.

In some embodiments, the routing device 104 may be configured to take further actions based on the performance score 306 and/or the updated knowledge score 312 of the agent. As an example, the routing device 104 may be configured to recommend that the agent transfers the user to another agent based on the performance score 306 and/or the updated knowledge score 312 of the agent. In this example, the routing device 104 may compare the performance score 306 and/or the updated knowledge score 312 to a predetermined score threshold value. In response to determining that the performance score 306 and/or the updated knowledge score 312 of the agent is less than the score threshold value, the routing device 104 may identify another agent that is associated with a knowledge score 312 that is greater than the knowledge score 312 of the current agent. The routing device 104 may then send a recommendation to the agent to connect the user to the other identified agent.

As another example, the routing device 104 may be configured to recommend alternative resolutions based on the performance score 306 from the resolution that the agent previously provided. In this example, the routing device 104 may also compare the performance score 306 and/or the updated knowledge score 312 to a predetermined score threshold value. In response to determining that the performance score 306 and/or the updated knowledge score 312 of the agent is less than the score threshold value, the routing device 104 may identify another resolution for the user's issue from the resolution mapping 116 that is associated with a higher performance score 306 than the current performance score 306. The routing device 104 may then send a recommendation to the agent that identifies the alternative resolution from the resolution mapping 116.

As another example, the routing device 104 may be configured to recommend training for the agent based on the performance score 306 and/or the updated knowledge score 312 of the agent. In this example, the routing device 104 may also compare the performance score 306 and/or the updated knowledge score 312 to a predetermined score threshold value. In response to determining that the performance score 306 and/or the updated knowledge score 312 of the agent is less than the score threshold value, the routing device 104 may identify a training curriculum that is associated with the issue type 304 that the user is experiencing and may send a recommendation to the agent that identifies the training curriculum. In other examples, the routing device 104 may be configured to take any other suitable type of actions based on the performance score 306 and/or the updated knowledge score 312 of the agent.

At step 218, the routing device 104 determines whether any other issues were identified by the user. Here, the routing device 104 determines whether any other issues were previously identified by the user in step 206. The routing device 104 returns to step 206 in response to determining that there are additional issues identified by the user. In this case, the routing device 104 will repeat steps 206-216 to update knowledge scores 312 for the agent based on the resolutions that are provided by the agent. Otherwise, the routing device 104 terminates process 200 in response to determining that there are no additional issues identified by the user. In this case, the routing device 104 concludes the analysis of the conversation between the user and the agent.

Communication Routing

Figure 4:
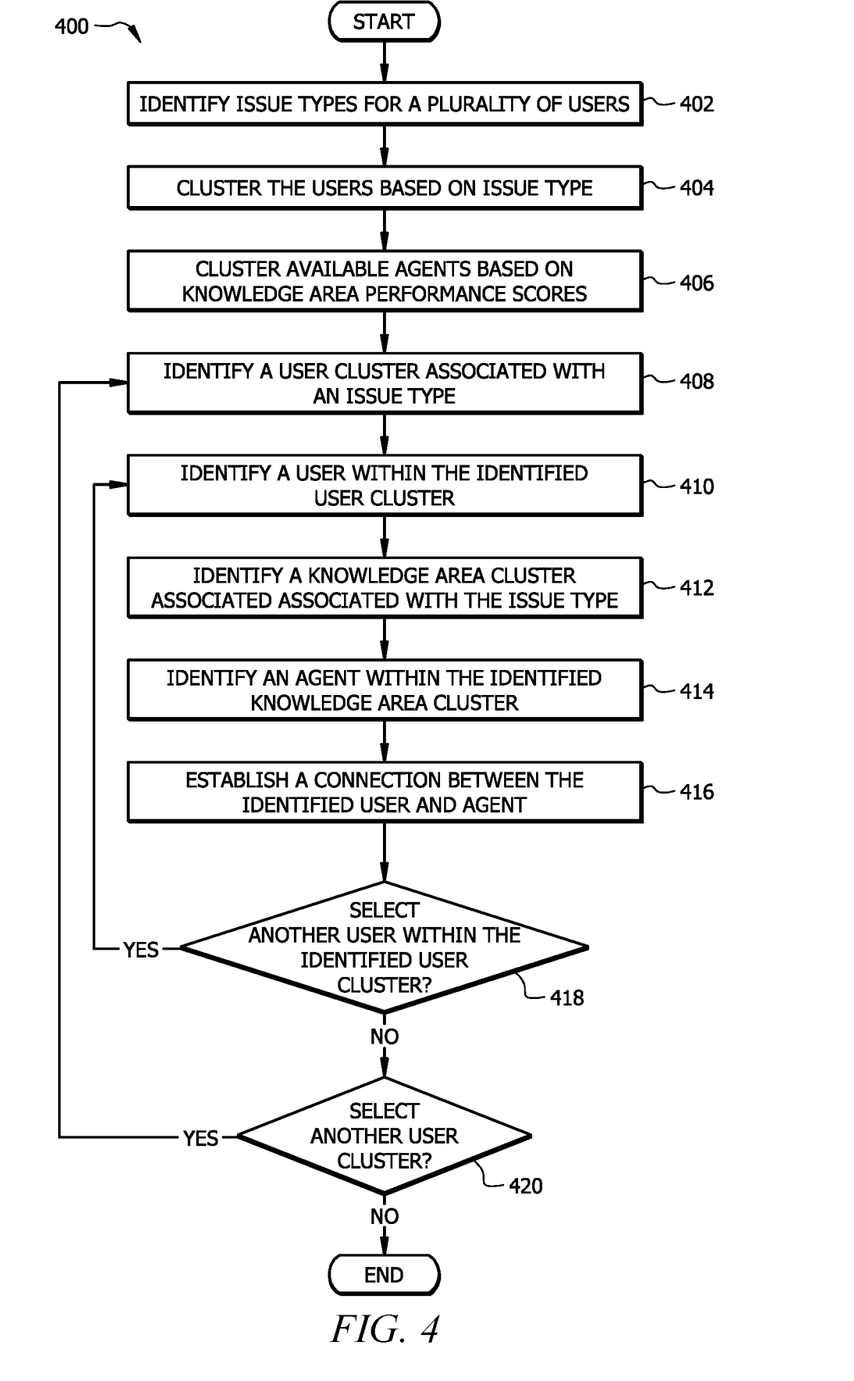
FIG. 4 is a flowchart of an embodiment of a communication routing process for the communication system.

FIG. 4 is a flowchart of an embodiment of a communication routing process 400 for the communication system 100. The communication system 100 may employ process 400 to identify any issues that the user is experiencing and to connect the user with the best available agent to help resolve the user's issues. Process 400 allows the routing device 104 to improve resource utilization which also increases the bandwidth and throughput of the communication system 100 by avoiding situations where an agent does not have the knowledge level to resolve a user's issues and/or situations where a user may need to be rerouted to other agents to resolve their issues.

Figure 3C:
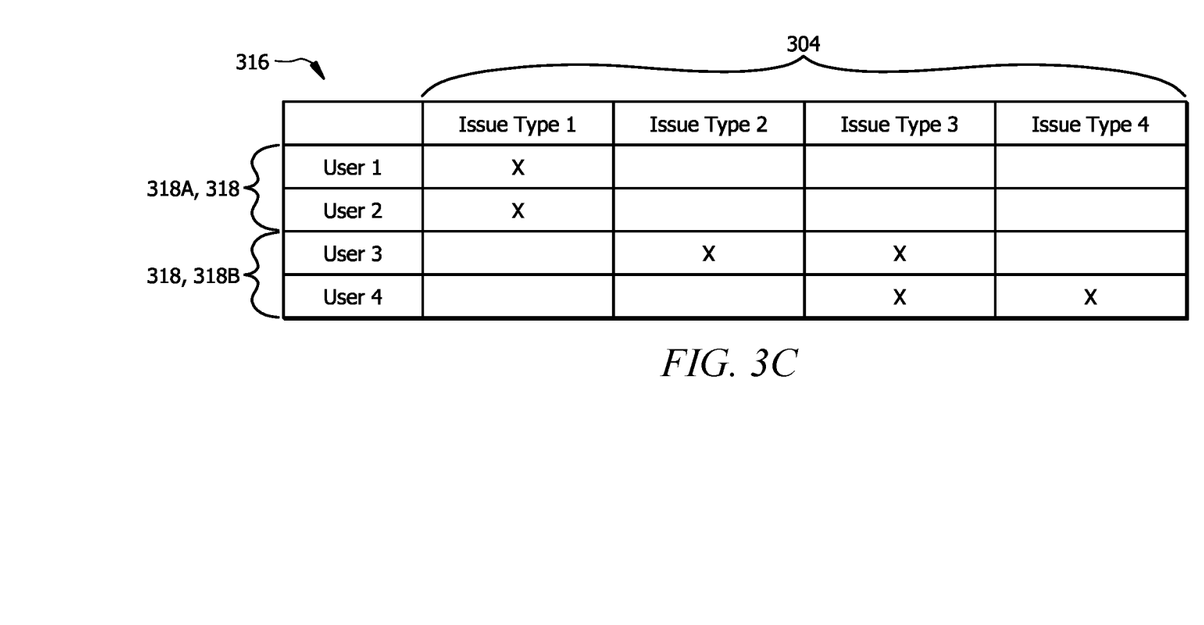
FIG. 3C is an example of communication requests.

At step 402, the routing device 104 identifies issue types 304 for a plurality of users. Here, the routing device 104 may receive communication requests 120 for multiple users that would like to connect with an agent about issues that they are experiencing. The routing device 104 may determine issue types 304 for the users using a process similar to the process described in step 206 in FIG. 2. After determining the issue types 304 for the users, the routing device 104 may generate a communication request queue 316. Referring to the example in FIG. 3C, the communication request queue 316 is configured to identify users and issue types 304 for the users. In this example, the communication request queue 316 is represented using a table. In other examples, the communication request queue 316 may be represented using any other suitable type of data structure.

Returning to FIG. 4 at step 404, the routing device 104 clusters the users based on the issue types 304. Here, the routing device 104 assigns each of the users to an issue clusters 318 based on the issue types 304 that are associated with the users. Each issue cluster 318 is associated with one or more issue types 304. The routing device 104 may first identify users that share one or more common issue types 304 and then may assign the users to an issue cluster 318 that corresponds with the one or more common issue types 304. Continuing with the example in FIG. 3C, the routing device 104 assigns "User 1" and "User 2" to a first issue cluster 318A that is associated with "Issue Type 1." The routing device 104 may also assign "User 3" and "User 4" to a second issue cluster 318B that is associated with "Issue Type 3." The routing device 104 may use any suitable type of cluster algorithm to identify users that share one or more common issue types 304 and to assign the users to an issue cluster 318.

Returning to FIG. 4 at step 406, the routing device 104 clusters available agents based on knowledge area performance scores. In one embodiment, the routing device 104 may first identify any available agents that are not currently assisting a user from the performance record 118. The routing device 104 may then assign the available agents to a knowledge area cluster 320 based on their knowledge scores 312. Each knowledge area cluster 320 corresponds with a knowledge area 310 that is associated with one or more issue types 304. Returning to the example in FIG. 3B, the routing device 104 may assign agents to a knowledge area cluster 320 based on their knowledge scores 312 within each knowledge area 310. For instance, the routing device 104 cluster agents that have the highest knowledge scores 312 within each knowledge area 310. In this example, the routing device 104 may assign "Agent 1" and "Agent 2" to a first knowledge area cluster 320A. The routing device 104 may also assign "Agent 3" and "Agent 4" to a second knowledge area cluster 320B.

As another example, the routing device 104 may identify a knowledge score 312 for an available agent that is associated with a knowledge area 310. The routing device 104 may compare the knowledge score 312 to a cluster threshold value. The cluster threshold value is a numerical value that identifies a minimum knowledge score 312 for being a member of a knowledge cluster 320 that is associated with the knowledge area 310. The routing device 104 may assign the agent to the knowledge cluster 320 in response to determining that the agent's knowledge score 312 is greater than or equal to the cluster threshold value. In other examples, the routing device 104 may use any other suitable criteria or clustering algorithm to assign the available agents to a knowledge area cluster 320.

At step 408, the routing device 104 identifies a user cluster 318 that is associated with an issue type 304. For example, the routing device 104 may iteratively select user clusters 318 from among the user clusters 318 that contain users that need to be connected to an agent.

At step 410, the routing device 104 identifies a user within the identified user cluster 318. Here, the routing device 104 iteratively selects users from the user cluster 318 that need to be connected to an agent. As an example, the routing device 104 may select users chronologically based on the time that their communication request 120 was received. As another example, the routing device 104 may users sequentially based on an identifier that is assigned to a user. In other examples, the routing device 104 may select users in any other order.

At step 412, the routing device 104 identifies a knowledge area cluster 320 that is associated with the issue type 304. Each knowledge area cluster 320 is associated with one or more issue types 304. The routing device 104 may first identify the issue type 304 that is associated with the issue cluster 318. The routing device 104 may then identify the knowledge area cluster 320 that corresponds with the identified issue type 304.

At step 414, the routing device 104 identifies an available agent within the identified knowledge area cluster 320. Here, the routing device 104 iteratively selects agents from the knowledge area cluster 320 that need to be connected to a user. As an example, the routing device 104 may select agents chronologically based on the time that became available. As another example, the routing device 104 may agents sequentially based on their agent identifier 308. As another example, the routing device 104 may select agents based on their knowledge score 312. In other examples, the routing device 104 may select agents in any other order.

At step 416, the routing device 104 establishes a connection between the identified user and the agent. After identifying an available agent and their agent user device 106, the routing device 104 may establish a voice call, a video call, a text-based chat session, or any other suitable type of communication channel between the user's user device 102 and the identified agent user device 106. The routing device 104 may establish the communication channel between the user's user device 102 and the identified agent user device 106 using any suitable technique or protocol. After establishing the connection between the user's user device 102 and the identified agent user device 106, the routing device 104 removes the user from the user cluster 318 and the agent from the knowledge area cluster 320.

At step 418, the routing device 104 determines whether to select another user within the identified user cluster 318. The routing device 104 may determine to select another user when at least one user from the identified user cluster 318 has not been assigned to an agent. The routing device 104 returns to step 410 in response to determining how to select another user within the identified user cluster 318. In this case, the routing device 104 repeats steps 410-416 to assign users to an agent. Otherwise, the routing device 104 proceeds to step 420 in response to determining not to select another user within the identified user cluster. In this case, the routing device 104 determines that all of the users from the identified user cluster 318 have been assigned to an agent. The routing device 104 may then proceed to step 420 to determine whether there are any remaining user clusters 318 with users that need to be connected to an agent.

At step 420, the routing device 104 determines whether to select another user cluster 318. The routing device 104 may determine to select another user cluster 318 when at least one user cluster 318 contains at least one user that has not been connected to an agent. The routing device 104 returns to step 408 in response to determining to select another user cluster. In this case, the routing device 104 repeats steps 408-418 to continue assigning users to agents. Otherwise, the routing device 104 terminates process 400 in response to determining not to select another user cluster. In this case, the routing device 104 determines that there are no users left to assign to an agent, and the routing device 104 terminates process 400.

Hardware Configuration

Figure 5:
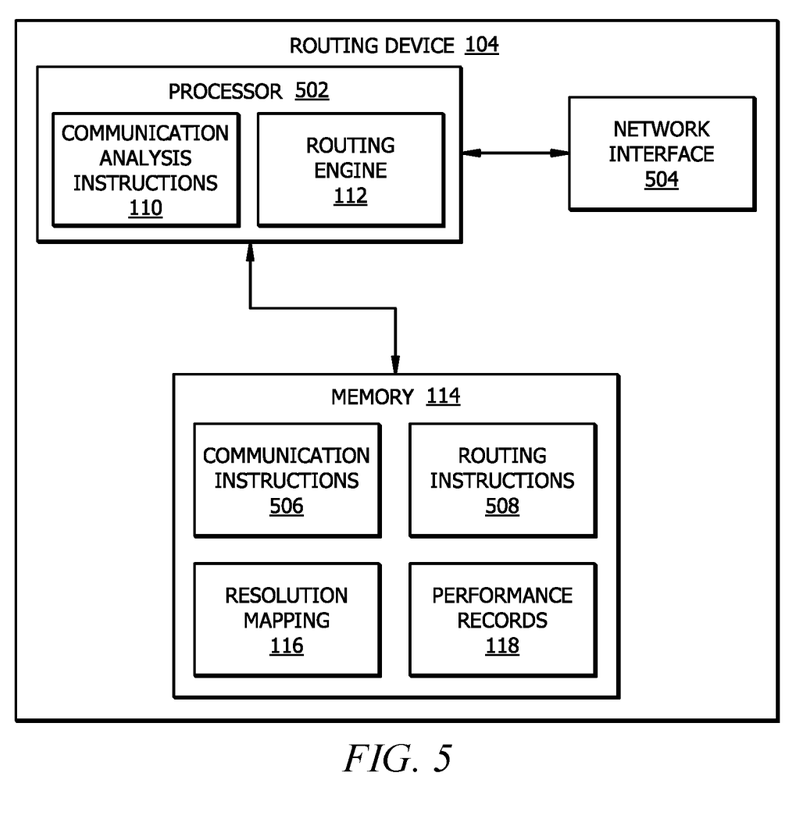
FIG. 5 is an embodiment of a routing device of a communication system.

FIG. 5 is an embodiment of a routing device 104 of a communication system 100. As an example, the routing device 104 comprises a processor 502, a memory 114, and a network interface 504. The routing device 104 may be configured as shown or in any other suitable configuration.

Processor

The processor 502 comprises one or more processors operably coupled to the memory 114, and the network interface 504. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 114, and the network interface 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute communication analysis instructions 506 and routing instructions 508 to implement the communication analysis engine 110 and the routing engine 112, respectively. In this way, processor 502 may be a special-purpose computer designed to implement the functions disclosed herein. In an embodiment, the communication analysis engine 110 and the routing engine 112 are each implemented using logic units, FPGAs, ASICs, DSPs, or any other suitable hardware. The communication analysis engine 110 and the routing engine 112 are configured to operate as described in FIGS. 1-4. For example, the communication analysis engine 110 may be configured to perform the steps of process 200 as described in FIG. 2. The routing engine 112 may be configured to perform the steps of process 400 as described in FIG. 4.

Memory

The memory 114 is operable to store any of the information described above with respect to FIGS. 1-4 along with any other data, instructions, logic, rules, or code operable to implement the function(s) described herein when executed by the processor 402. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store communication analysis instructions 506, routing instructions 508, resolution mapping 116, performance records 118, and/or any other data or instructions. The communication analysis instructions 506 may comprise any suitable set of instructions, logic, rules, or code operable to execute the communication analysis engine 110. The routing instructions 508 may comprise any suitable set of instructions, logic, rules, or code operable to execute the routing engine 112. The resolution mapping 116 and the performance records 118 are configured similar to the resolution mapping 116 and the performance records 118 described in FIGS. 1-4.

Network Interface

The network interface 504 is configured to enable wired and/or wireless communication. The network interface 504 is configured to communicate data between the user device 102, agent user devices 106, and other devices, systems, or domains. For example, the network interface 504 may comprise a Near Field Communication (NFC) interface, a Bluetooth interface, a Zigbee interface, a Z-wave interface, an RFID interface, a WIFI interface, a LAN interface, a WAN interface, a PAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A communication routing device, comprising:
    a network interface configured to establish connections between users and agents;
    a memory operable to store a performance record, wherein:
        the performance record identifies a plurality of agents; and
        each agent is mapped to a plurality of knowledge scores, wherein each knowledge score indicates an expertise level in a knowledge area; and
    a processor operably coupled to the network interface and the memory, and configured to:
        identify issue types for a plurality of users;
        assign each user from among the plurality of users to an issue cluster based on the identified issue types, wherein each issue cluster is associated with an issue type;
        identify a plurality of available agents;
        assign each available agent from among the plurality of available agents to one or more knowledge area clusters based on knowledge scores of the agent, wherein each knowledge area cluster is associated with an issue type, wherein assigning an available agent to a knowledge area cluster comprises:
            identifying a knowledge score of the available agent that is associated with a knowledge area related to the knowledge area cluster;
            comparing the knowledge score to a cluster threshold value,
        wherein the cluster threshold value identifies a minimum knowledge score for being a member of the knowledge area cluster;
            determining that the knowledge score is greater than or equal to the cluster threshold value; and
            in response to the determining, assigning the available agent to the knowledge area cluster;
        identify a first issue cluster that is associated with a first issue type;
        identify a first user from the first issue cluster;
        identify a first knowledge area cluster that is associated with the first issue type;
        identify a first agent from the first knowledge area cluster; and
        establish a network connection between a first user device associated with the first user and a second user device associated with the first agent.

2. The device of claim 1, wherein establishing the network connection between the first user and the first agent comprises establishing a voice call between the first user and the first agent.

3. The device of claim 1, wherein establishing the network connection between the first user and the first agent comprises establishing a text-based chat session between the first user and the first agent.

4. The device of claim 1, wherein the processor is further configured to:
    remove the first user from the first issue cluster after establishing the connection between the first user and the first agent; and
    remove the first agent from all knowledge area clusters after establishing the connection between the first user and the first agent.

5. The device of claim 1, wherein identifying an issue type for a user comprises:
    providing a survey that comprises one or more questions to the user;
    receiving a survey response from the user; and
    determining the issue type based on the survey response.

6. The device of claim 1, wherein identifying an issue type for a user comprises identifying one or more keywords spoken by the user during a conversion.

7. A communication routing method, comprising:
    identifying issue types for a plurality of users;
    assigning each user from among the plurality of users to an issue cluster based on the identified issue types, wherein each issue cluster is associated with an issue type;
    identifying a plurality of available agents;
    assigning each available agent from among the plurality of available agents to one or more knowledge area clusters based on knowledge scores of the agent, wherein:
        each knowledge area cluster is associated with an issue type;
        each knowledge score indicates an expertise level in a knowledge area;
        assigning an available agent to a knowledge area cluster comprises:
            identifying a knowledge score of the available agent that is associated with a knowledge area related to the knowledge area cluster;
            comparing the knowledge score to a cluster threshold value,
        wherein the cluster threshold value identifies a minimum knowledge score for being a member of the knowledge area cluster;
            determining that the knowledge score is treater than or equal to the cluster threshold value; and
            in response to the determining, assigning the available agent to the knowledge area cluster;
    identifying a first issue cluster that is associated with a first issue type;
    identifying a first user from the first issue cluster;
    identifying a first knowledge area cluster that is associated with the first issue type;
    identifying a first agent from the first knowledge area cluster; and
    establishing a network connection between a first user device associated with the first user and a second user device associated with the first agent.

8. The method of claim 7, wherein establishing the network connection between the first user and the first agent comprises establishing a voice call between the first user and the first agent.

9. The method of claim 7, wherein establishing the network connection between the first user and the first agent comprises establishing a text-based chat session between the first user and the first agent.

10. The method of claim 7, further comprising:
removing the first user from the first issue cluster after establishing the connection between the first user and the first agent; and
removing the first agent from all knowledge area clusters after establishing the connection between the first user and the first agent.

11. The method of claim 7, wherein identifying an issue type for a user comprises:
providing a survey that comprises one or more questions to the user;
receiving a survey response from the user; and
determining the issue type based on the survey response.

12. The method of claim 7, wherein identifying an issue type for a user comprises identifying one or more keywords spoken by the user during a conversion.

13. A computer program product comprising executable instructions stored in a non-transitory computer-readable medium that when executed by a processor causes the processor to:
identify issue types for a plurality of users;
assign each user from among the plurality of users to an issue cluster based on the identified issue types, wherein each issue cluster is associated with an issue type;
identify a plurality of available agents;
assign each available agent from among the plurality of available agents to one or more knowledge area clusters based on knowledge scores of the agent, wherein:
each knowledge area cluster is associated with an issue type;
each knowledge score indicates an expertise level in a knowledge area;
assigning an available agent to a knowledge area cluster comprises:
identifying a knowledge score of the available agent that is associated with a knowledge area related to the knowledge area cluster;
comparing the knowledge score to a cluster threshold value,
wherein the cluster threshold value identifies a minimum knowledge score for being a member of the knowledge area cluster;
determining that the knowledge score is greater than or equal to the cluster threshold value; and
in response to the determining, assigning the available agent to the knowledge area cluster;
identify a first issue cluster that is associated with a first issue type;
identify a first user from the first issue cluster;
identify a first knowledge area cluster that is associated with the first issue type;
identify a first agent from the first knowledge area cluster; and
establish a network connection between a first user device associated with the first user and a second user device associated with the first agent.

14. The computer program product of claim 13, wherein establishing the network connection between the first user and the first agent comprises establishing a voice call between the first user and the first agent.

15. The computer program product of claim 13, wherein establishing the network connection between the first user and the first agent comprises establishing a text-based chat session between the first user and the first agent.

16. The computer program product of claim 13, wherein identifying an issue type for a user comprises:
providing a survey that comprises one or more questions to the user;
receiving a survey response from the user; and
determining the issue type based on the survey response.

17. The computer program product of claim 13, wherein identifying an issue type for a user comprises identifying one or more keywords spoken by the user during a conversion.

* * * * *